US012642726B2

(12) United States Patent
Furman et al.

(10) Patent No.: US 12,642,726 B2
(45) Date of Patent: Jun. 2, 2026

(54) TECHNIQUES FOR DETERMINING A POSE OF A PATIENT TRANSPORT APPARATUS

(71) Applicant: Stryker Corporation, Portage, MI (US)

(72) Inventors: Aaron Douglas Furman, Kalamazoo, MI (US); Chad Conway Souke, Vicksburg, MI (US); Thomas Alan Puvogel, Kalamazoo, MI (US); Joshua Alan Mansfield, Lawton, MI (US)

(73) Assignee: Stryker Corporation, Portage, MI (US)

( * ) Notice: Subject to any disclaimer, the term of this patent is extended or adjusted under 35 U.S.C. 154(b) by 0 days.

(21) Appl. No.: 18/985,203

(22) Filed: Dec. 18, 2024

(65) Prior Publication Data

US 2025/0228725 A1 Jul. 17, 2025

Related U.S. Application Data

(63) Continuation of application No. 18/381,726, filed on Oct. 19, 2023, now Pat. No. 12,208,045, which is a (Continued)

(51) Int. Cl.
*A61G 7/10* (2006.01)
*A61G 1/02* (2006.01)

(Continued)

(52) U.S. Cl.
CPC ............. *A61G 7/1046* (2013.01); *A61G 1/02* (2013.01); *A61G 1/052* (2013.01); *A61G 7/012* (2013.01);

(Continued)

(58) Field of Classification Search
CPC ........ A61G 7/1046; A61G 1/02; A61G 1/052; A61G 7/16; A61G 7/1013; A61G 2203/44;

(Continued)

(56) References Cited

U.S. PATENT DOCUMENTS 5,050,135 A 9/1991 Pai et al.
5,074,000 A 12/1991 Soltani et al.

(Continued)

FOREIGN PATENT DOCUMENTS

EP 4588464 A1 * 7/2025 ........... A61G 1/0567

*Primary Examiner* — Robert G Santos

(74) *Attorney, Agent, or Firm* — Howard & Howard Attorneys PLLC

(57) ABSTRACT

A patient transport apparatus comprising a support frame, a base, a bracket coupled to the support frame and comprising a channel being non-linear, a frame assembly coupled between the support frame and the base and comprising a slidable member disposed in the channel, the slidable member being moveable between a plurality of different positions in the channel to place the support frame in a plurality of different poses relative to the base. The patient transport apparatus also comprises a sensor configured to detect the slidable member in the channel and produce a reading, as well as a controller coupled to the sensor and configured to receive the reading from the sensor, determine the position of the slidable member in the channel based on the reading, and determine the pose of the support frame relative to the base based on the determined position of the slidable member.

20 Claims, 8 Drawing Sheets

Related U.S. Application Data continuation of application No. 17/562,308, filed on Dec. 27, 2021, now Pat. No. 11,826,297, which is a continuation of application No. 16/271,117, filed on Feb. 8, 2019, now Pat. No. 11,246,781.

(60) Provisional application No. 62/628,522, filed on Feb. 9, 2018.

(51) Int. Cl.

| | |
|---|---|
| ***A61G 1/052*** | (2006.01) |
| ***A61G 7/012*** | (2006.01) |
| ***A61G 7/018*** | (2006.01) |
| ***A61G 7/16*** | (2006.01) |
| ***A61G 13/02*** | (2006.01) |
| ***A61G 13/06*** | (2006.01) |

(52) U.S. Cl.

CPC ........... *A61G 7/018* (2013.01); *A61G 7/1013* (2013.01); *A61G 7/16* (2013.01); *A61G 13/02* (2013.01); *A61G 13/06* (2013.01); *A61G 2203/30* (2013.01); *A61G 2203/40* (2013.01); *A61G 2203/44* (2013.01)

(58) Field of Classification Search

CPC ............ A61G 2203/40; A61G 2203/30; A61G 1/0567; A61G 1/0212; A61G 1/0262; A61G 7/012; A61G 7/018; A61G 13/02; A61G 13/06

USPC ................ 5/86.1, 83.1, 81.1 R, 600, 611, 11

See application file for complete search history.

(56) References Cited

U.S. PATENT DOCUMENTS

| | | | | |
|---|---|---|---|---|
| 5,313,160 | A | 5/1994 | Gloden et al. | |
| 5,495,914 | A | 3/1996 | DiMucci et al. | |
| 5,697,471 | A | 12/1997 | DiMucci et al. | |
| 5,740,884 | A | 4/1998 | DiMucci et al. | |
| 5,983,425 | A | 11/1999 | DiMucci et al. | |
| 7,150,056 | B2 | 12/2006 | Lemire | |
| 7,389,552 | B1 | 6/2008 | Reed et al. | |
| 7,398,571 | B2 | 7/2008 | Souke et al. | |
| 8,051,513 | B2 | 11/2011 | Reed et al. | |
| 8,056,950 | B2 | 11/2011 | Souke et al. | |
| 8,155,918 | B2 | 4/2012 | Reed et al. | |
| 8,156,586 | B2 | 4/2012 | Reed et al. | |
| 10,085,632 | B1 | 10/2018 | Dishong et al. | |
| 10,987,260 | B2 | 4/2021 | Souke et al. | |
| 10,987,268 | B2 | 4/2021 | Souke et al. | |
| 11,197,790 | B2 | 12/2021 | Mansfield et al. | |
| 11,246,781 | B2 | 2/2022 | Furman et al. | |
| 11,672,711 | B2 | 6/2023 | Mansfield et al. | |
| 11,826,297 | B2 | 11/2023 | Furman et al. | |
| 12,042,435 | B2 | 7/2024 | Mansfield et al. | |
| 12,208,045 | B2 * | 1/2025 | Furman | A61G 7/1013 |
| 12,453,663 | B2 * | 10/2025 | Mansfield | A61G 1/003 |
| 2002/0174487 | A1 | 11/2002 | Kramer et al. | |
| 2006/0075558 | A1 | 4/2006 | Lambarth et al. | |
| 2009/0165207 | A1 | 7/2009 | Reed et al. | |
| 2009/0165208 | A1 | 7/2009 | Reed et al. | |
| 2009/0222988 | A1 | 9/2009 | Reed et al. | |
| 2018/0303685 | A1 | 10/2018 | Souke et al. | |
| 2018/0303689 | A1 | 10/2018 | Souke et al. | |
| 2018/0339589 | A1 | 11/2018 | Senba et al. | |
| 2019/0247257 | A1 | 8/2019 | Furman et al. | |
| 2020/0138648 | A1 | 5/2020 | Mansfield et al. | |
| 2022/0062072 | A1 | 3/2022 | Mansfield et al. | |
| 2022/0117816 | A1 | 4/2022 | Furman et al. | |
| 2023/0263674 | A1 | 8/2023 | Mansfield et al. | |
| 2024/0041680 | A1 | 2/2024 | Furman et al. | |
| 2024/0325218 | A1 * | 10/2024 | Mansfield | A61G 1/003 |
| 2025/0228718 | A1 * | 7/2025 | Ludemann | A61G 3/0245 |
| 2025/0228725 | A1 * | 7/2025 | Furman | A61G 13/02 |
| 2025/0367044 | A1 * | 12/2025 | Mansfield | A61G 1/003 |

* cited by examiner

TECHNIQUES FOR DETERMINING A POSE OF A PATIENT TRANSPORT APPARATUS

CROSS-REFERENCE TO RELATED APPLICATIONS

The subject patent application is a Continuation of U.S. patent application Ser. No. 18/381,726 filed on Oct. 19, 2023 and issued as U.S. U.S. Pat. No. 12,208,045 on Jan. 28, 2025, which is a Continuation of U.S. patent application Ser. No. 17/562,308 filed on Dec. 27, 2021 and issued as U.S. Pat. No. 11,826,297 on Nov. 28, 2023, which is a Continuation of U.S. patent application Ser. No. 16/271,117 filed on Feb. 8, 2019 and issued as U.S. Pat. No. 11,246,781 on Feb. 15, 2022, which claims priority to and all the benefits of U.S. Provisional Patent Application No. 62/628,522 filed on Feb. 9, 2018, the disclosures of each of which are hereby incorporated by reference in their entirety.

BACKGROUND

Patient transport apparatuses, such as hospital beds, stretchers, cots, tables, wheelchairs, and chairs facilitate care and transportation of patients. Conventional patient transport apparatuses includes a base, a frame assembly, and a support frame coupled to a patient support surface upon which the patient is supported. The frame assembly is coupled between the base and the support frame and helps to place the patient transport apparatus in various poses (e.g., heights/tilts) to allow for care and transportation of the patient.

To aid in placing the patient transport apparatus in a pose, one prior configuration, as disclosed in U.S. Pat. No. 7,398,571, teaches a housing secured to the support frame. The housing has a linear channel and position sensors (e.g., transducers or Hall effect sensors) at each end of the housing. A magnet is mounted to a sliding member that moves within the housing. The position sensors detect a magnetic field of the magnet and generate signals indicative of the height position of the patient transport apparatus.

With this prior configuration, the true or absolute position of the slidable member in the linear channel is determined using low-resolution, and is therefore, generalized or approximated to a few discrete positions. In turn, the pose of the patient transport apparatus can only be identified using coarse approximations (i.e., high or low). The sensors do not account for the true or absolute pose of the patient transport apparatus. Hence, any downstream actions/controls/notifications relying on the pose of the patient transport apparatus necessarily are limited to the coarse approximations of the pose.

As such, there remains a need to improve techniques for sensing and determining the position of the slidable member in the channel. Additionally, there remains a need in the art to further improve a design of the channel, allowing the frame assembly to more efficiently place the support frame in the plurality of different poses.

BRIEF DESCRIPTION OF THE DRAWINGS

Advantages of the present disclosure will be readily appreciated as the same becomes better understood by reference to the following detailed description when considered in connection with the accompanying drawings wherein.

DETAILED DESCRIPTION

Referring to FIGS. 1A-3B, a patient transport apparatus 10 is shown for supporting a patient in a health care and/or transportation setting. The patient transport apparatus 10 illustrated in FIGS. 1A-3B includes a cot. In other embodiments, however, the patient transport apparatus 10 may include a hospital bed, stretcher, table, wheelchair, chair, or similar apparatus utilized in the transportation and care of a patient.

Figure 1A:
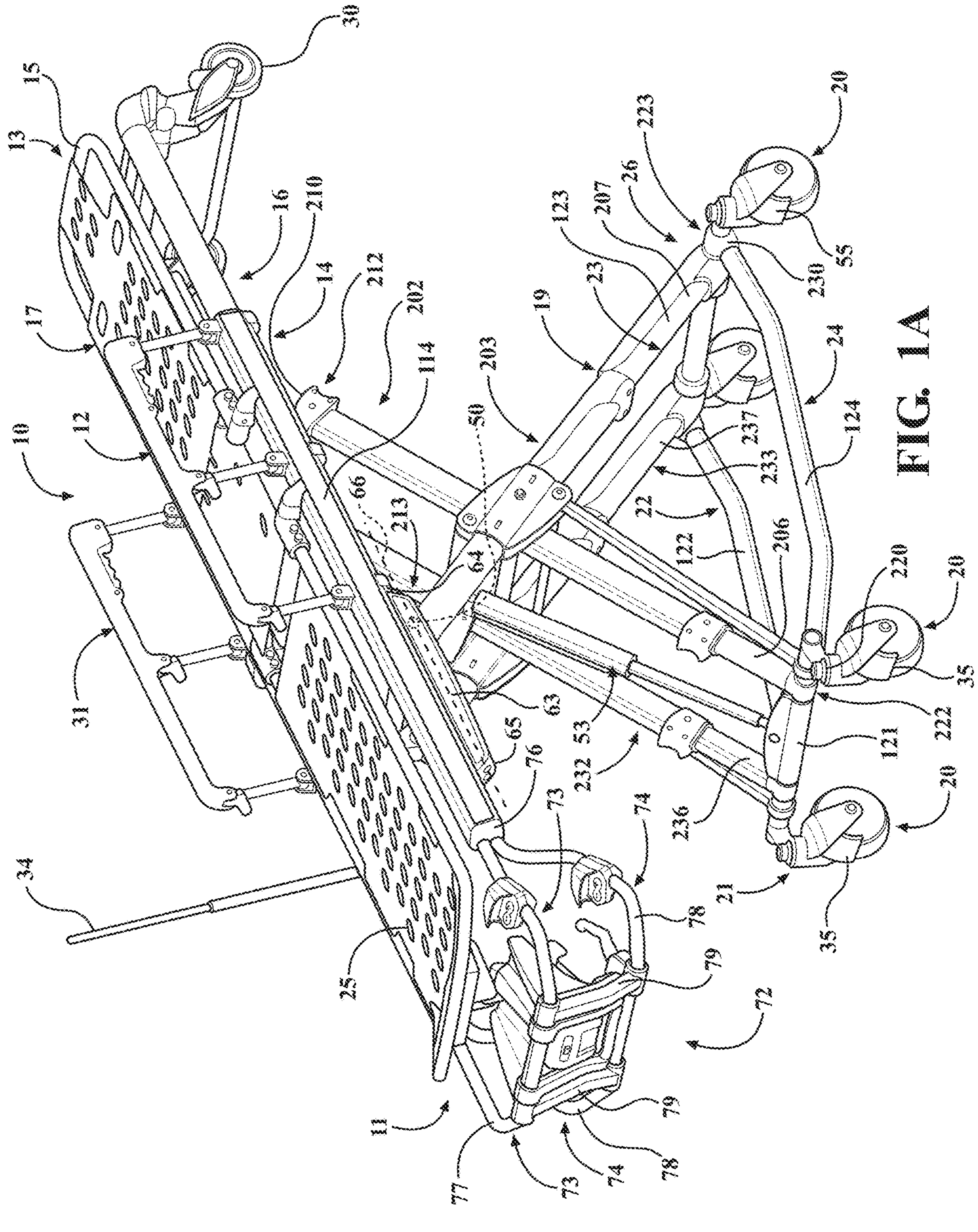
FIG. 1A is a perspective view of a patient transport apparatus.

As shown in FIG. 1A, the patient transport apparatus 10 includes a support frame 16 configured to support the patient. The support frame 16 can be like that shown in U.S. Patent Application Publication No. US 2018/0303689 A1, entitled "Emergency Cot With A Litter Height Adjustment Mechanism," the disclosure of which is hereby incorporated by reference in its entirety.

Figures 2A, 2B:
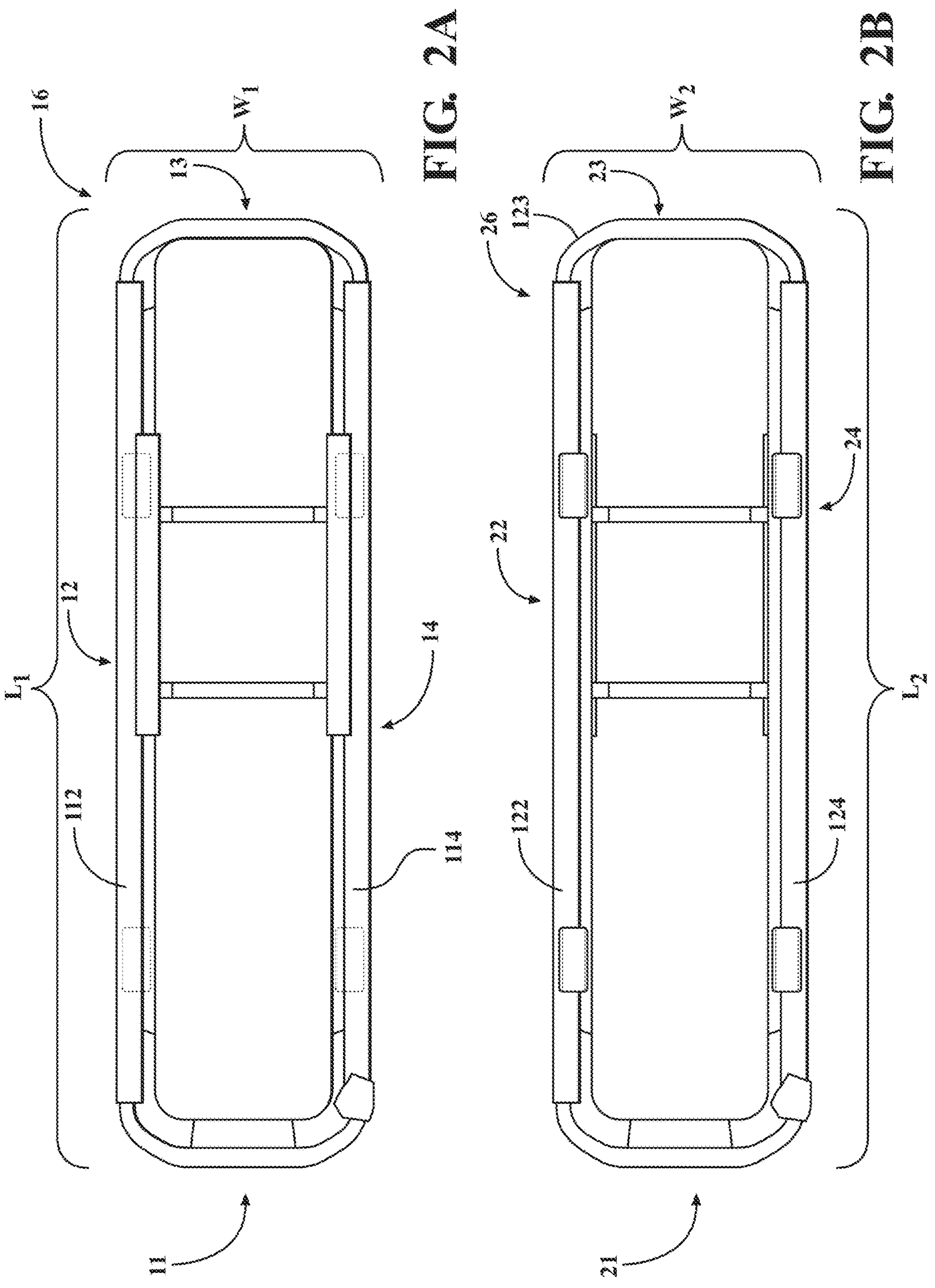
FIG. 2A is a top view of the patient transport apparatus of FIG. 1A.
FIG. 2B is a bottom view of the patient transport apparatus of FIG. 1A.

The support frame 16 is further illustrated from a top view of the patient transport apparatus 10 in FIG. 2A. As shown in FIG. 2A, the support frame 16 includes a length, labelled as length "$L_1$", and a width, labelled as width "$W_1$", wherein the length $L_1$ is longer than the width $W_1$. The support frame 16 may include two opposing sides 11, 13 along the width $W_1$ coupled to two opposing sides 12, 14 along the length $L_1$.

The support frame 16 may have various configurations and may include a variety of components. Hollow side rails 112, 114 (side rail 112 shown in FIG. 2A) are attached at sides of the support frame 16. In the example of FIG. 1A, side 11 of the patient transport apparatus 10 includes a foot end handle 72, which may include a pair of vertically spaced U-shaped frame members 73 and 74. The frame members 73, 74 may be joined together by frame brackets 76 (only one frame bracket 76 is shown in FIG. 1A), which may be telescopingly affixed inside side rails 112, 114, as illustrated in FIG. 1A. A fastener or pin (not illustrated) may be utilized to facilitate a connection of the frame brackets 76 to the interior of each of the respective side rails 112, 114. Furthermore, as shown, frame member 74 may diverge from frame member 73, providing pairs of vertically spaced hand grip areas 77, 78 on frame members 73, 74, respectively. Additionally, spacer brackets 79 may be connected to opposing portions of each of the frame members 73 and 74 to maintain the vertical spacing between the grip areas 77 and 78.

The support frame 16 may be coupled to a variety of components that aid in supporting and/or transporting the patient. For example, in FIG. 1A, the support frame 16 is coupled to a patient support deck comprising a patient support surface 17, upon which the patient directly rests. The patient support deck may include one or more articulable sections, for example, a back section 15 and a foot section 25, to facilitate care and/or transportation of the patient.

The support frame 16 may also be coupled to loading wheels 30. As shown in FIG. 1A, the loading wheels 30 may extend from the support frame 16 proximate to the back section 15 of the patient support surface 17 and may facilitate loading and unloading of the patient transport apparatus 10 from a vehicle. In one example, the loading wheels 30 may be positioned and configured to facilitate loading and unloading the patient transport apparatus 10 into an ambulance.

The support frame 16 may also be coupled to hand rails 31. In FIG. 1A, the hand rails 31 extend from opposing sides of the support frame 16 and provide egress barriers for the patient on the patient support surface 17. The hand rails 31 may also be utilized by an individual, such as an emergency medical technician (EMT) or other medical professional, to move or manipulate the patient transport apparatus 10. In some embodiments, the hand rails 31 may include a hinge, pivot or similar mechanism to allow the hand rails 31 to be folded or stored at or below the plane of the patient support surface 17. The support frame 16 may also be coupled to a vertical support member 34. The vertical support member 34 may be configured to hold a medical device or medication delivery system, such as a bag of fluid to be administered via an IV. The vertical support member 34 may also be configured for the operator of the patient transport apparatus 10 to push or pull on the vertical support member 34 to manipulate or move the patient transport apparatus 10.

The patient transport apparatus 10 may include a base 26. The base 26 is further illustrated in FIG. 2B, a bottom view of the patient transport apparatus. As shown in FIG. 2B, the base 26 includes a length, labelled as length "$L_2$", and a width, labelled as width "$W_2$", wherein the length $L_2$ is longer than the width $W_2$. The base may include two opposing sides 21, 23 along the width $W_2$ coupled to two opposing sides 22, 24 along the length $L_2$. As shown in FIG. 1A, the sides 22, 24 may include longitudinally-extending side rails 122, 124 and sides 21, 23 may include crosswise-extending rails 121, 123 which may be coupled at the ends thereof to the side rails 122, 124.

A plurality of caster wheel assemblies 20 may be operatively connected proximate to each corner of the base 26 formed by the longitudinally-extending side rails 122, 124 and the crosswise-extending rails 121, 123. The wheel assemblies 20 may be configured to swivel to facilitate turning of the patient transport apparatus 10. The wheel assemblies 20 may include a swivel locking mechanism to prevent the wheel assemblies 20 from swiveling when engaged. The wheel assemblies 20 may also include wheel brakes 35 to prevent rotation of the wheel.

Figure 1B:
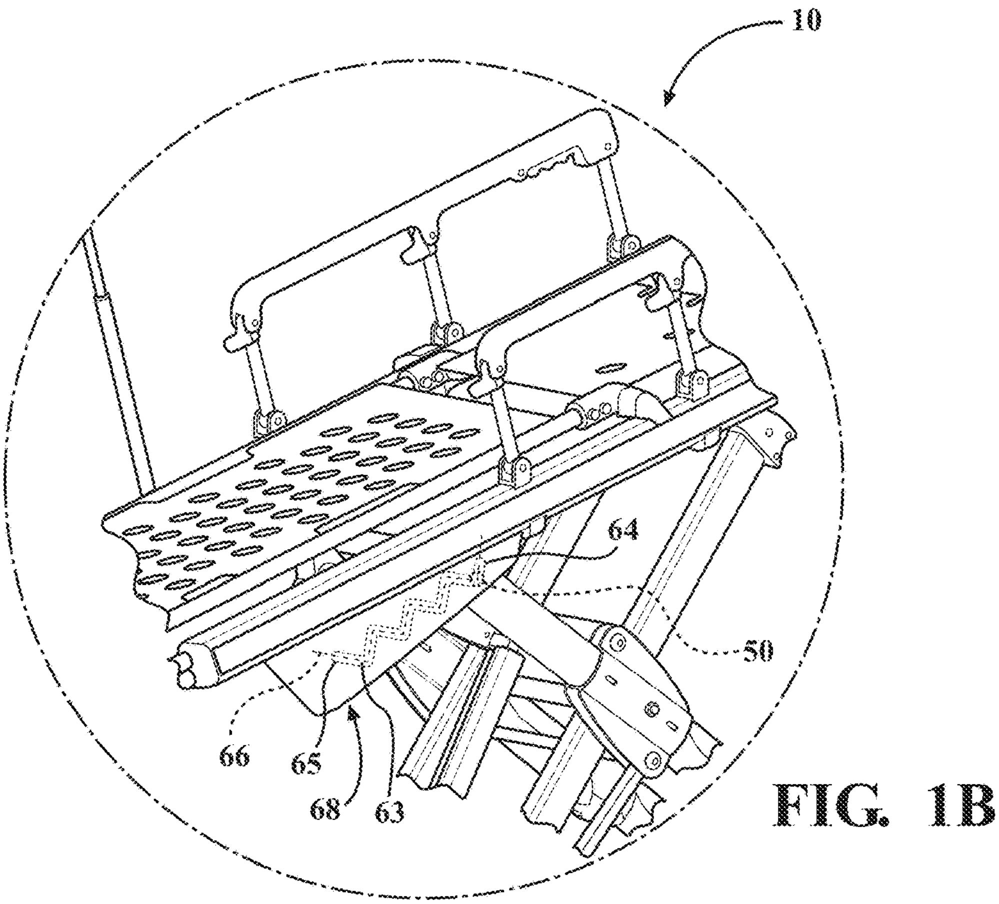
FIGS. 1B and 1C are partial views of the patient transport apparatus, focusing on various examples of a bracket of the patient transport apparatus.
Figure 1C:
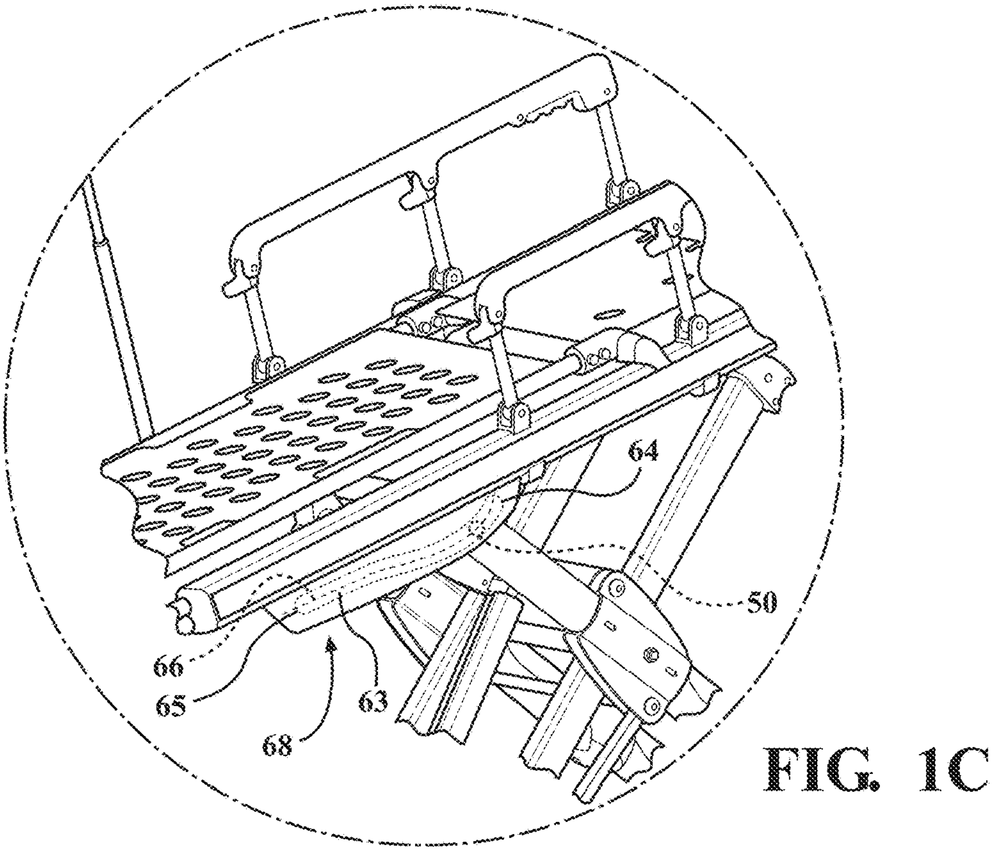

The patient transport apparatus 10 includes a bracket 68, which may be coupled to the support frame 16. As shown in FIGS. 1A-1C, the bracket 68 is coupled to an underside of the side rail 114 of side 14 of the support frame 16. In other examples, the bracket 68 may be coupled to a different location on the support frame 16. For instance, the bracket 68 may be coupled to a side of the side rail 114 which is closest to side 12. In another example, the bracket 68 may be coupled to the support frame 16 via another component of the patient transport apparatus 10. In one such example, the bracket 68 may be coupled to the support frame 16 via the patient support deck. Furthermore, it should be noted that, while the bracket 68 is shown as coupled to side 14 of the support frame 16 in FIGS. 1A and 1B, another bracket 68 may be coupled to side 12 of the support frame 16. For example, another bracket 68 may also be coupled to an underside of the side rail 112 of side 12 of the support frame 16.

Also shown in FIGS. 1A-1C, the bracket 68 includes a channel 63. The channel 63 includes a first end 64 of the channel 63 and a second end 65 of the channel 63, which define a length 66 of the channel 63 (represented as a dotted-line in FIG. 1A). The channel 63 may have various configurations and shapes, e.g., straight, zig-zag, S-shaped, curved, diagonal/sloped, or any combination thereof. The shape of the channel 63 may be defined based on a representation of the length 66 of the channel 63 on a Cartesian plane. For example, in the embodiment of FIG. 1A, the length 66 may be represented using a linear function and, therefore, the channel 63 in FIG. 1A may be described as having a linear shape. In the embodiment of FIGS. 1B and 1C, the length 66 may be represented using a non-linear function and, therefore, the channel 63 in FIGS. 1B and 1C may be described as having a non-linear shape. In the example of FIG. 1B, the length 66 may be represented using a piecewise function and, therefore, the channel 63 in FIG. 1B may be described as having a piecewise shape. Similarly, the length 66 in FIG. 1B may be represented using a curvilinear function, and the channel 63 in FIG. 1B may be described as having a curvilinear shape. In other embodiments, the channel 63 may have other shapes, such as a combination of the above-stated linear or non-linear shapes. The channel 63 may have any configuration other than those described specifically herein and shown in the Figures. The bracket 68 and the channel 63 can be like that shown in U.S. Patent Application Publication No. US 2018/0303689 A1, previously referenced.

The patient transport apparatus 10 includes a frame assembly 18 coupled between the support frame 16 and the base 26. The frame assembly 18 can be like that shown in U.S. Patent Application Publication No. US 2018/0303689 A1, previously referenced. In the example of FIG. 1, the frame assembly 18 includes a slidable member 50, which is disposed in the channel 63 and is moveable between a plurality of different positions in the channel 63. For example, in one position of the slidable member 50, the slidable member 50 may be adjacent to the first end 64 of the channel 63. In another example, the position of the slidable member 50 may be one-quarter of the length 66 of the channel 63 from the second end 65 of the channel 63. The slidable member 50 can be like that shown in U.S. Patent Application Publication No. US 2018/0303689 A1, previously referenced.

Furthermore, the slidable member 50 is moveable between the plurality of different positions in the channel 63 to place the support frame 16 in a plurality of different poses relative to the base 26. For example, in one embodiment, the support frame 16 may be placed in a maximum-raised pose (shown in FIG. 3A) and a maximum-lowered pose (shown in FIG. 3B). In one example, the slidable member 50 is adjacent to the first end 64 of the channel 63 in the maximum-raised pose and the slidable member 50 is adjacent the second end 65 in the maximum-lowered pose. The slidable member 50 is described as being adjacent to the first end 64 and the second end 65 of the slidable member 50 because, in some embodiments, the slidable member 50 may be configured to never physically contact or fully reach the ends 64, 65 of the channel 63. Thus, the support frame 16 may be placed in the maximum-raised or maximum-lowered pose while the slidable member 50 is in a position between the ends 64, 65 of the channel 63.

Figure 3A:
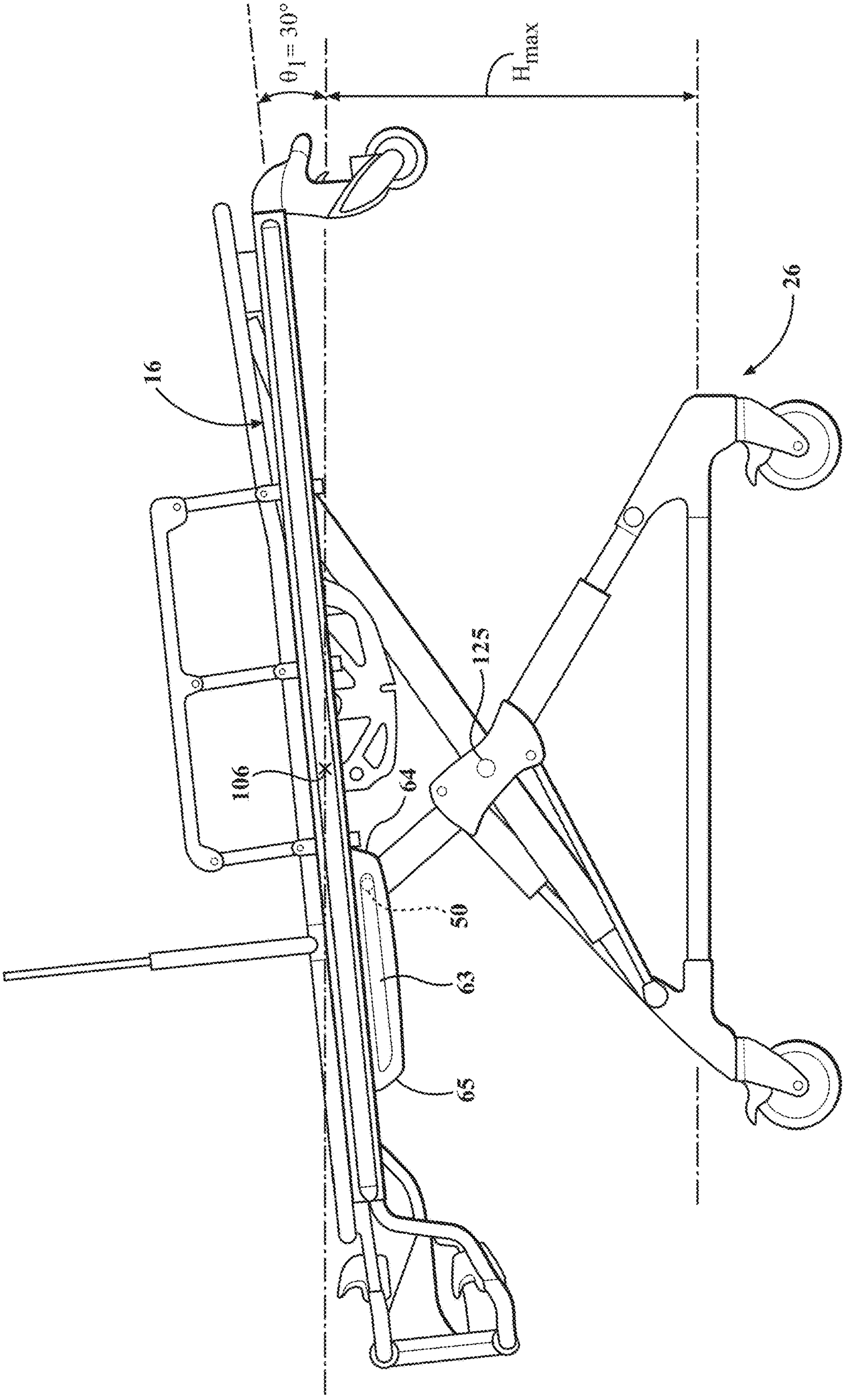
FIG. 3A is a side view of the patient transport apparatus of FIG. 1A in a maximum-raised pose.
Figure 3B:
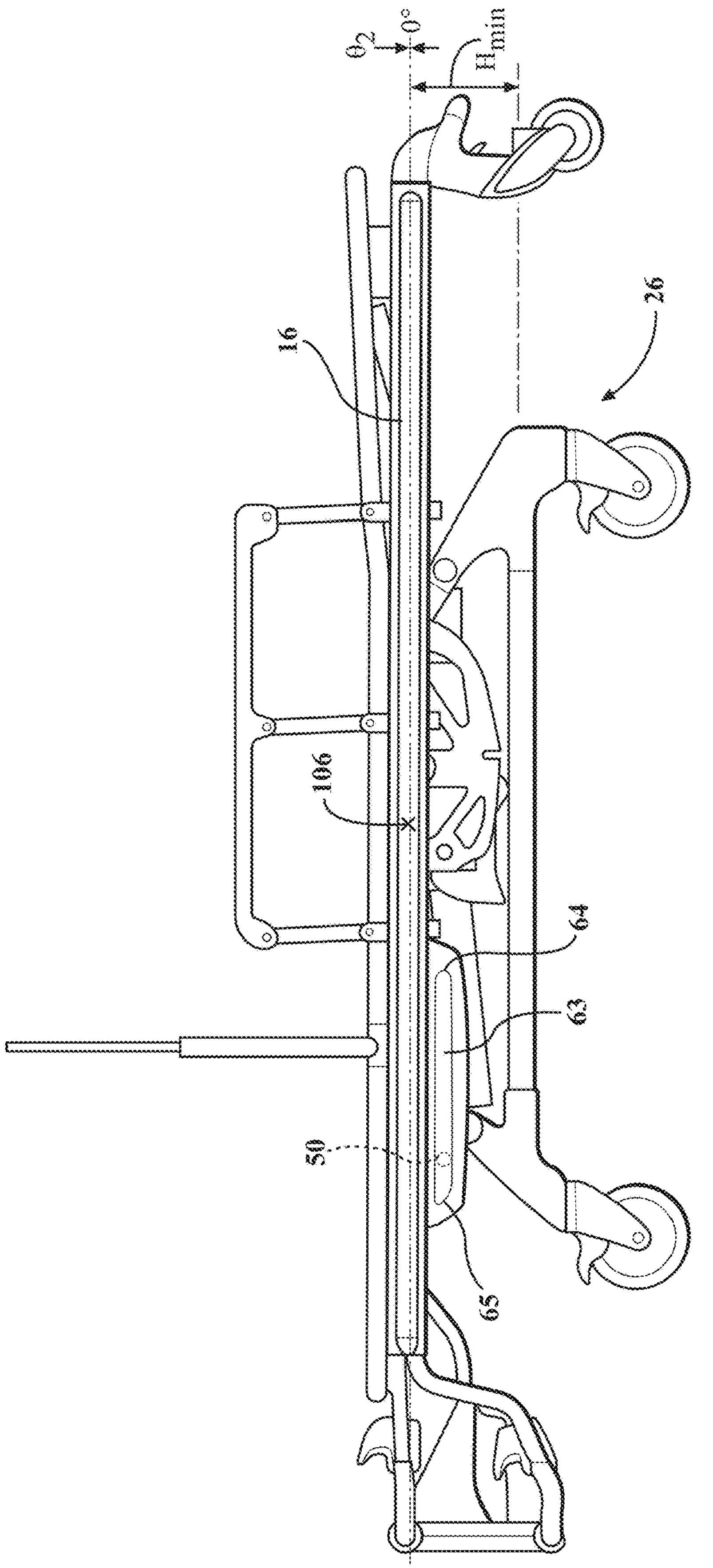
FIG. 3B is a side view of the patient transport apparatus of FIG. 1A in a maximum-lowered pose.

The maximum-raised pose of FIG. 3A and the maximum-lowered pose of FIG. 3B demonstrate that each pose of the plurality of poses may include an orientation of the support frame 16 relative to the base 26. In one example, the orientation of the support frame 16 may be based on an angle of a head-end of the support frame 16 relative to the base 26. For example, in the maximum-raised pose shown in FIG. 3A, the head-end of the support frame 16 is oriented at a first angle, labelled as "$\theta_1$", relative to the base 26. In the embodiment of FIG. 3A, the head-end of the support frame 16 is oriented at 30° relative to the base 26 in the maximum-raised pose. In the maximum-lowered pose shown in FIG. 3B, the head-end of the support frame 16 is oriented at a second angle, labelled as "$\theta_2$", relative to the base 26. In the embodiment of FIG. 3B, the head-end of the support frame 16 is oriented at 0° relative to the base 26 in the maximum-lowered pose.

It should be noted that, in other embodiments, $\theta_1$ and $\theta_2$ may be any angle between a minimum negative angle of the head-end of the support frame 16 relative to the base 26 and a maximum positive angle of the head-end of the support frame 16 relative to the base 26. For example, in an embodiment where the head-end of the support frame 16 is flat relative to the base 26 in the maximum-raised pose, $\theta_1$ may be 0°.

Additionally, for any pose of the support frame 16, the angle of the head-end of the support frame 16 relative to the base 26 may be any angle between a minimum negative angle and a maximum positive angle. For instance, the support frame 16 may be placed in a medium-raised pose when the slidable member 50 is between the first end 64 and the second end 65 of the channel 63. In such an embodiment, the support frame 16 may be oriented such that the head-end of the support frame 16 may be −15° relative to the base 26.

Furthermore, the orientation of the support frame 16 relative to the base 26 may be based on an angle of any other part of the support frame 16 relative to the base 26. For example, the orientation of the support frame 16 may be based on an angle of the foot-end of the support frame 16 relative to the base 26. Additionally or alternatively, the orientation of the support frame 16 may be determined relative to the floor surface.

The maximum-raised pose of FIG. 3A and the maximum-lowered pose of FIG. 3B also demonstrate that each pose may include a position of the support frame 16 relative to the base 26. For example, the position of the support frame 16 may be a height of a reference point on the support frame 16 relative to the base 26. In the maximum-raised pose of FIG. 3A and the maximum-lowered pose of FIG. 3B, the position of the support frame 16 is based on a height of a midpoint 106 of the support frame 16.

In the example of FIG. 3A, the support frame 16 is positioned at a maximum possible height relative to the base 26, labelled as "$H_{max}$" in the maximum-raised pose. Similarly, in the example of FIG. 3B, the support frame 16 is positioned at a minimum possible height relative to the base 26, labelled as "$H_{min}$", in the maximum-lowered pose.

The position may be measured from (with respect to) any reference structure (point or origin) of the patient transport apparatus 10 having a determinable or known position. The position of the support frame 16 relative to the base 26 may be based on a height of any point along the support frame 16 or the frame assembly 18. For example, the position of the support frame 16 may be based on a height of a pivot axle 125 of the frame assembly 18, the pivot axle 125 shown in FIG. 3A.

It should be noted that the maximum-raised pose and the maximum-lowered pose are named as such because, in the above-stated examples, the support frame 16 is at a maximum height relative the base 26 at the maximum-raised pose and at a minimum height relative the base 26 at the maximum-lowered pose. However, in other instances, the slidable member 50 may be adjacent to the first end 64 of the channel 63 in a pose where the support frame 16 is not at a maximum height. Similarly, the slidable member 50 may be adjacent to the second end 65 in a pose where the support frame 16 is not at a minimum height. Additionally, for any pose of the support frame 16, the height of the support frame 16 relative to the base 26 may be any height between the minimum possible height $H_{min}$ and the maximum possible height $H_{max}$, inclusive.

In one example, each position of the slidable member 50 in the channel 63 corresponds to one pose of the support frame 16. Similarly, each pose of the support frame 16 corresponds to one position of the slidable member 50 in the channel 63. There may be instances where the different positions in the channel 63 may result in identical poses of the support frame 16.

Furthermore, each pose of support frame 16 includes a unique combination of a position and an orientation of the support frame 16 relative to the base 26. Different poses may have the same position (e.g., height) but different orientations (e.g. tilt), or the same orientations but different positions. In other examples, the pose may be based solely on the position without regard to the orientation, e.g., if the orientation is dictated by the position.

In FIG. 1A, the frame assembly 18 includes a first frame member 203 and a second frame member 202, both of which are coupled to the support frame 16 and the base 26. A first end 212 of the second frame member 202 may be pivotally coupled to the head-end of the support frame 16 at a connection point 210 such that the second frame member 202 may pivot about the connection point 210. A second end 222 of the second frame member 202 may be pivotally coupled to a foot-end of the base 26 at a connection point 220 such that the second frame member 202 may pivot about the connection point 220. Furthermore, a first end 213 of the first frame member 203 may be pivotally coupled to a foot-end of the support frame 16 via the slidable member 50. More specifically stated, and shown in FIG. 1, the first end 213 may be pivotally coupled to the slidable member 50, which is disposed in the channel 63 of the bracket 68, which is coupled to the support frame 16.

As such, the first frame member 203 is pivotally coupled to the support frame 16 and may pivot about the slidable member 50. Also shown, a second end 223 of the first frame member 203 may be pivotally coupled to a head-end of the base 26 at a connection point 230 such that the first frame member 203 may pivot about the connection point 230. Furthermore, the first frame member 203 and the second frame member 202 may be pivotally coupled to each other at the pivot axle 125 to form an "X" frame 19.

It should be noted that the frame assembly 18 may include a second, similarly constructed second X frame, which may include a third frame member 233 and a fourth frame member 232. Similar to X frame 19, the third frame member 233 and the fourth frame member 232 of the second X frame may be pivotally coupled to a side of the support frame 16 and a side of the base 26. For example, the third frame member 233 and the fourth frame member 232 of the second X frame may be pivotally coupled to a side of the support frame 16 and a side of the base 26, which oppose a side of the support frame 16 and a side of the base 26 to which the first frame member 203 and the second frame member 202 are coupled. In one such embodiment, as shown in FIG. 1A, the second X frame is coupled to side 12 of the support frame 16 and to side 22 of the base 26 and X frame 19 is coupled to side 14 of the support frame 16 and to side 24 of the base 26. It should be noted that any reference herein to the first frame member 203 may also be a reference to the third frame member 233. Similarly, any reference to the second frame member 202 may also be a reference to the fourth frame member 232.

In FIG. 1A, the frame members 202, 203, 232, 233 are hollow and telescopingly include further frame members 206, 207, 236, 237, respectively. Further frame members 206, 207, 236, 237 are supported for movement into and out of the respective frame members 202, 203, 232, 233 to extend a length of the respective frame members 202, 203, 232, 233. In the embodiment shown in FIG. 1A, the further frame members 206, 207, 236, 237 extend out of frame members 202, 203, 232, 233 toward the base 26. However, in other examples, the further frame members 206, 207, 236, 237 may extend out of frame members 202, 203, 232, 233 toward the support frame 16. In these examples, frame members 202, 203, 232, 233 are coupled to the base 26 or the support frame 16 via further frame members 206, 207, 236, 237. However, in other examples, the frame members 202, 203, 232, 233 may be of a fixed length and exclude further frame members 206, 207, 236, 237.

Additionally, it should be noted that, while the frame assembly 18 in the embodiment of FIG. 1A includes four frame members 202, 203, 232, 233, the frame assembly 18 may include any suitable number of frame members.

As previously stated, the slidable member 50 is coupled to the first end 213 of the first frame member 203 and therefore, the first end 213 of the first frame member 203 and the slideable member 50 may be integrally moveable along the length of the channel 63. Referring now to the previously described maximum raised pose and maximum lowered pose of FIGS. 3A and FIG. 3B, in the maximum raised pose, the first end 213 of the first frame member 203 may be moved to the first end 64 of the channel 63. In the maximum lowered pose, the first end 213 of the first frame member 203 may be moved to the second end 65 of the channel 63.

Furthermore, the first frame member 203 may be configured to move the slidable member 50 between the plurality of positions in the channel 63. As the slidable member 50 moves in the channel 63, the slidable member 50 forces or causes the support frame 16 to change poses relative to the base 26.

In one example, the slidable member 50 may move in the channel 63 due to a patient care provider applying a manual action to the frame assembly 18, or components thereof. Additionally or alternatively, the patient transport apparatus 10 includes one or more actuators 53, which may be coupled to the first frame member 203 or the second frame member 202 and configured to move at least one of the first frame member 203 and the second frame member 202 to place the support frame 16 in different poses.

The actuator 53 may be configured to move at least one of the first frame member 203 and the second frame member 202 such that a distance between the first end 213 of the first frame member 203 and the second end 222 of the second frame member 202 may be greater in the maximum raised pose than in the maximum lowered pose. Additionally or alternatively, the actuator 53 may be configured to move at least one of the first frame member 203 and the second frame member 202 such that a distance between the second end 223 of the first frame member 203 and the first end 212 of the second frame member 202 may be greater in the maximum raised pose than in the maximum lowered pose.

Examples of such actuators 53 are described in U.S. Pat. No. 7,398,571, filed on Jun. 30, 2005, entitled, "Ambulance Cot and Hydraulic Elevating Mechanism Therefor," the disclosure of which is hereby incorporated by reference in its entirety. Furthermore, techniques for utilizing such actuators 53 to manipulate the components of the patient transport apparatus 10 can be like those described in U.S. Patent Application Publication No. US 2018/0303689 A1, previously referenced.

The previously-described shape of the channel 63 may allow the frame assembly 18 to place the support frame 16 in a pose using a higher lift efficiency. To explain, the slidable member 50 exerts force on the channel 63 to cause the support frame 16 to change pose. The force is defined relative to a contact point between the slidable member 50 and edge(s) of the channel 63. The shape of the channel 63 may be selected to minimize an amount of force exerted by the slidable member 50 on the edges of the channel 63 when the slidable member 50 moves in the channel 63. The shape of the channel 63 may reduce spikes in force that are needed to overcome frictional constraints in the channel 63, and the like. In one example, the shape of the channel may be a curvilinear shape, which limits an amount of force the slidable member 50 exerts on the edges of the channel 63 as the slidable member 50 moves from the first end 64 to the second end 65 of the channel 63. In turn, the force can be applied in smoother, and more efficient manner.

Furthermore, the shape of the channel 63 may allow the frame assembly 18 to place the support frame 16 in a pose, while retaining an appropriate leveling of the support frame 16. As previously stated, the pose of the support frame 16 includes a position and an orientation of the support frame 16. Additionally, the position of the slidable member 50 in the channel 63 corresponds to a pose of the support frame 16. As such, the shape of the channel 63 affects the pose of the support frame 16. As the slidable member 50 moves along the length of the channel 63, the position of the slidable member 50 may be divided into a vertical coordinate and a horizontal coordinate, relative to the Cartesian plane of the channel 63. When the vertical coordinate is greater than a predetermined vertical reference value (e.g., a zero-vertical line), the orientation of the support frame 16 is altered. Similarly, when the horizontal coordinate is greater than a predetermined horizontal reference value (e.g., a zero-horizontal line), the position of the support frame 16 is altered. Said differently, the vertical coordinate corresponds to a tilting of the support frame 16 and the horizontal coordinate corresponds to a raising and lowering of the support frame 16. Alternately, the channel 63 may be configured such that the opposite occurs, i.e., the horizontal coordinate corresponds to a tilting of the support frame 16 and the vertical coordinate corresponds to a raising and lowering of the support frame 16.

As such, the shape of the channel 63 may be selected based on an appropriate leveling of the support frame 16. For example, in the previously described embodiment, the support frame 16 is placed in the maximum-raised pose, where the support frame 16 is positioned at a maximum height and the head-end of the support frame 16 is oriented at an angle of 30° relative to the base 26. Furthermore, the support frame 16 is placed in the maximum-lowered pose, where the support frame 16 is positioned at a minimum height and the head-end of the support frame 16 is oriented at an angle of 0° relative to the base 26. In these examples, the shape of the channel 63 may be selected such that, as the slidable member 50 moves between the first end 64 and the second end 65 of the channel 63, the support frame 16 is positioned from the maximum height to the minimum height according to a constant (linear) manner and the head-end of the support frame 16 is oriented from an angle of 30° to an angle of 0° according to a constant (linear) manner. Due to the mechanical configuration and interaction of the components of the patient transport apparatus 10, linear change in position and orientation may be possible even where the channel 63 has a non-linear configuration. Alternatively or additionally, changes in pose may temporarily occur in a fluctuating (non-linear) manner.

Figure 4:
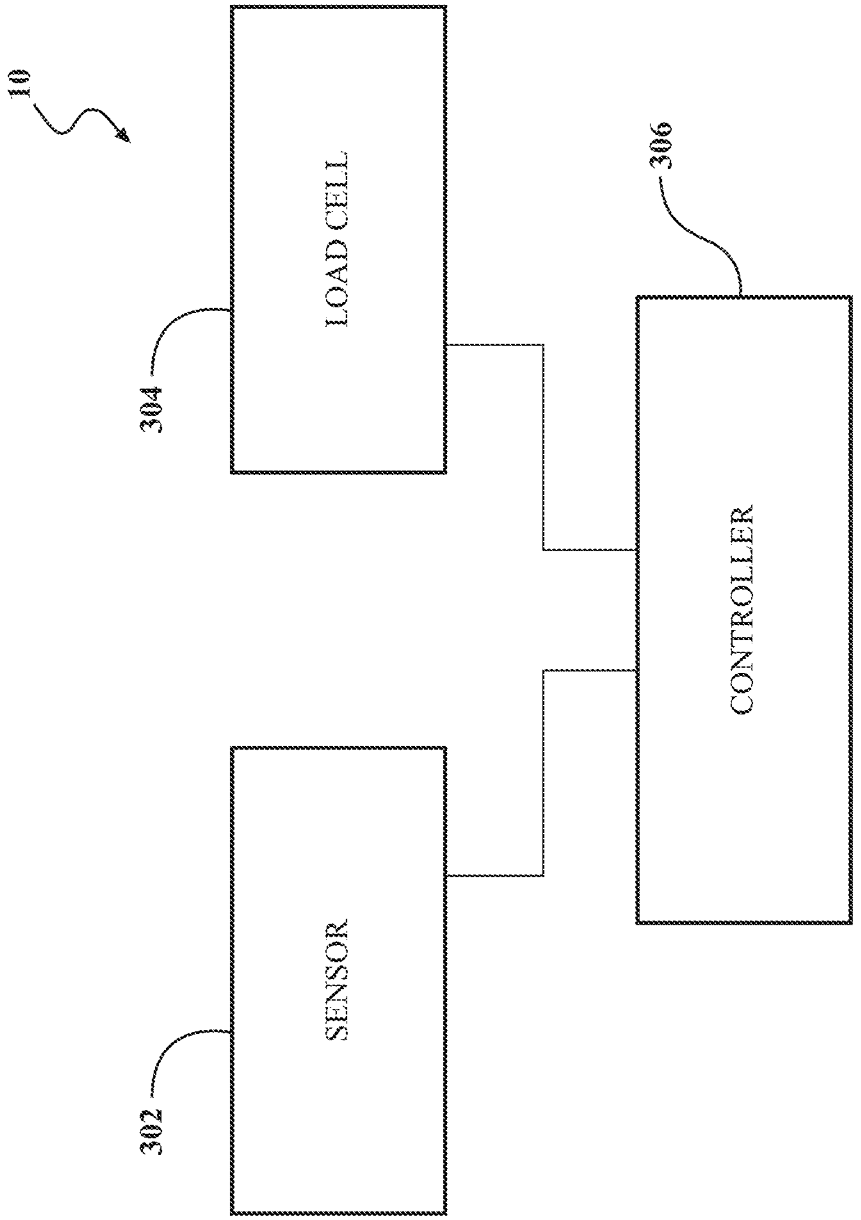
FIG. 4 is a schematic diagram of a sensor, a load cell, and a controller of the patient transport apparatus.

Referring now to FIG. 4, the patient transport apparatus 10 may also include a sensor 302 configured to detect the slidable member 50 in the channel 63 and produce a reading. The sensor 302 may be any sensor suitable for detecting the slidable member 50 in the channel 63. For example, the sensor 302 may include one or more of an optical sensor, an ultrasonic sensor, a Hall effect sensor, a laser sensor, a proximity sensor, a velocity sensor, a displacement sensor, an Eddy-current sensor, a capacitive displacement sensor, a magneto-based (elastic or resistive) sensor, and an inductive non-contact position sensor. In certain instances, the sensor 302 is disposed directly in the channel 63. In other examples, the sensor 302 may be disposed at a different location apparatus 10 suitable for detecting the slidable member 50 in the channel 63, e.g., at a location adjacent to the channel 63, but not directly in the channel 63. The patient transport apparatus 10 may include a plurality of sensors 302 configured to detect the slidable member 50.

Also shown in FIG. 4, the patient transport apparatus 10 may include a controller 306. The controller 306 may include memory configured to store data, information, and/or programs. Additionally, the controller 306 may include one or more microprocessors, microcontrollers, field programmable gate arrays, systems on a chip, discrete circuitry, and/or other suitable hardware, software, or firmware that is capable of carrying out the functions described herein. The controller 306 may be carried on-board the patient transport apparatus 10, or may be remotely located. The controller 306 may execute instructions for performing any of the techniques described herein.

Figure 5:
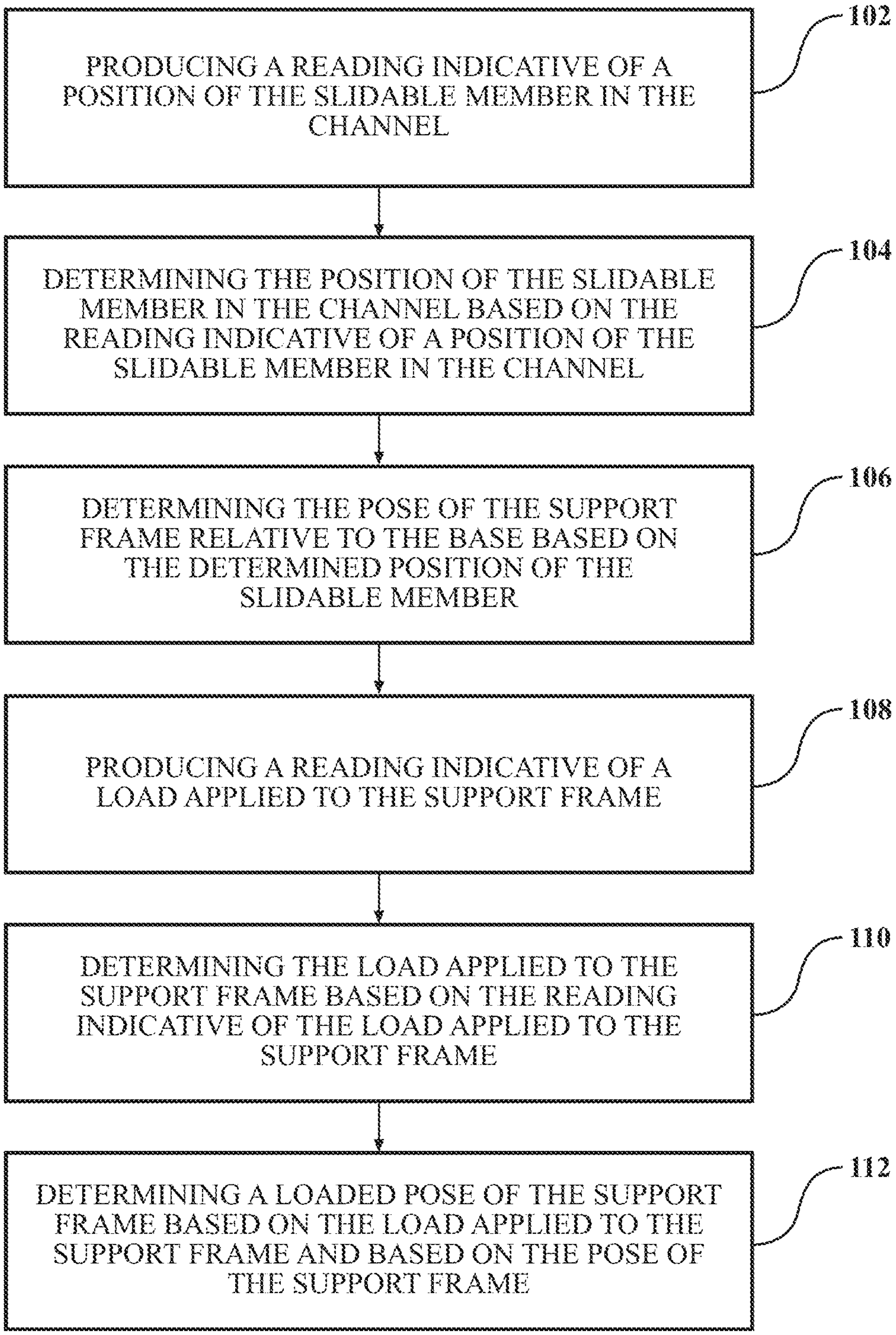
FIG. 5 is a flowchart of a method of determining a pose of a support frame of the patient transport apparatus.

FIG. 5 illustrates a method of determining the pose of support frame 16. As shown, the method includes a step 102 of producing, with the sensor 302, a reading indicative of the position of the slidable member 50 in the channel 63; a step 104 of determining, with the controller 306, the position of the slidable member 50 in the channel 63 based on the reading produced by the sensor 302; and a step 106 of determining, with the controller 306, the pose of the support frame 16 relative to the base 26 based on the determined position of the slidable member 50.

Figure 6A:
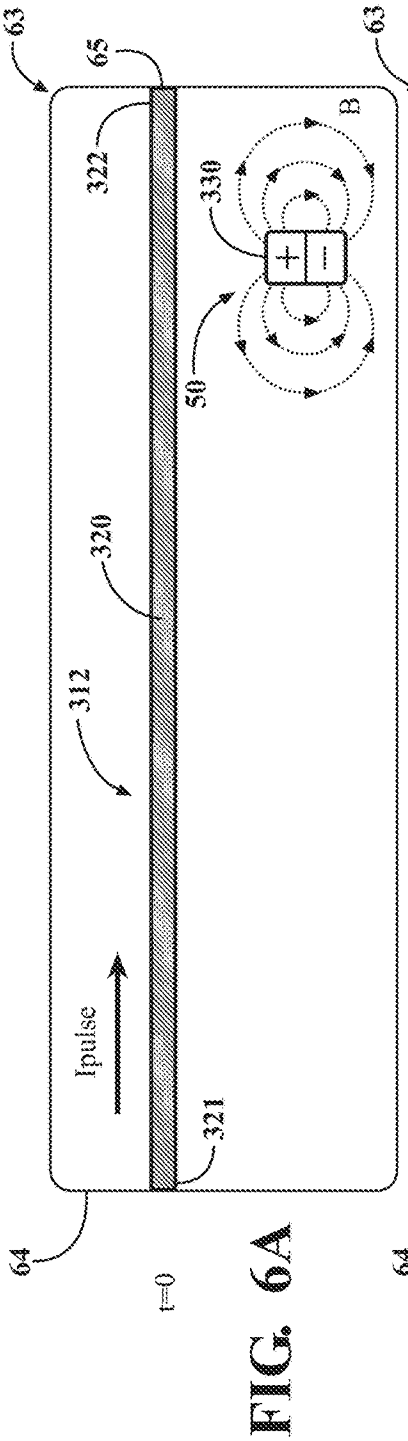
FIG. 6A-6C are diagrammatic views of a step of producing, with a magnetostrictive sensor, a reading indicative of a position of a slidable member of the patient transport apparatus.
Figure 6B:
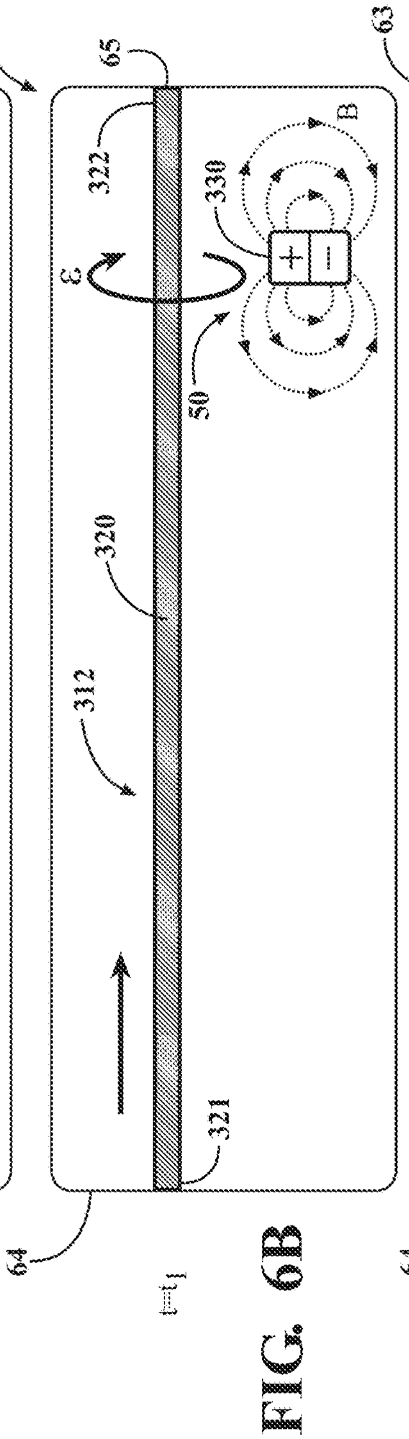
Figure 6C:
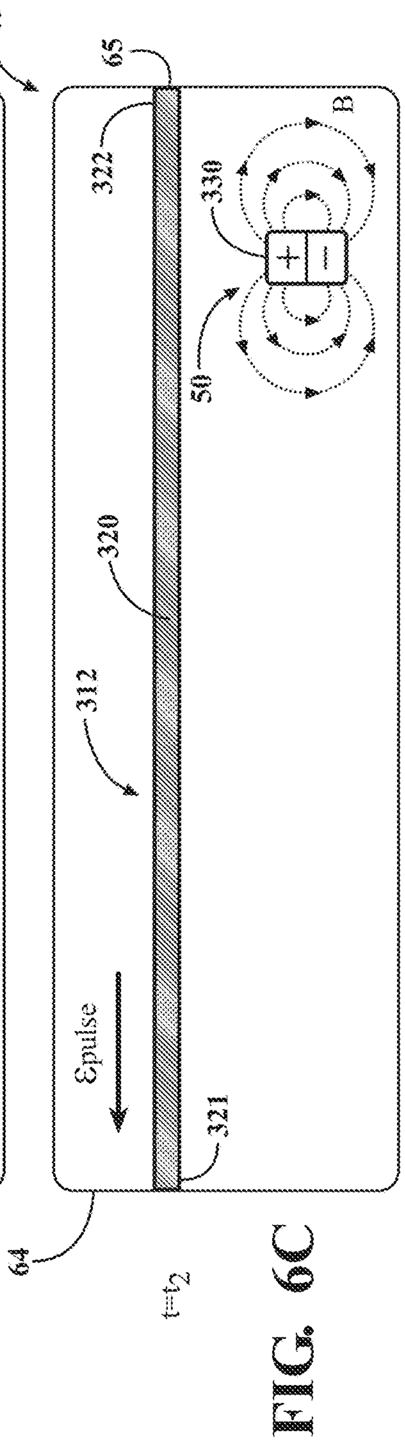

In one embodiment, as shown in FIGS. 6A-6C, the sensor 302 may be a magnetostrictive sensor 312 disposed in the channel 63. The magnetostrictive sensor 312 includes magnetostrictive material, which changes in shape when influenced by a magnetic field. A magnet 330 may be coupled to the slidable member 50 and therefore, moveable between the plurality of different positions in the channel 63. In such an embodiment, step 102 may be executed using the magnetostrictive sensor 312 and may include a step of producing a reading in response to an interaction of the magnetostrictive sensor 312 and the magnet 330.

FIGS. 6A-6C illustrate operation of the magnetostrictive sensor 312 in the channel 63. As shown, the magnetostrictive sensor 312 may include a waveguide 320, which may include magnetostrictive material. The waveguide 320 includes a first end 321 and a second end 322 defining a length of the waveguide 320. The first end 321 of the waveguide 320 is disposed adjacent to the first end 64 of the channel 63 and the second end 322 of the waveguide 320 is disposed adjacent to the second 65 end of the channel 63. Also shown, the magnet 330 is disposed at a position $x_1$ along the length waveguide, the first end 321 of the waveguide 320 being $x=0$. The magnet 330 generates a magnetic field, labelled "B", in FIGS. 6A-6C.

It should be noted that, while the waveguide 320 is illustrated as a having a straight shape, the waveguide 320 may have any other suitable shape. For example, the waveguide 320 may have various configurations and shapes, e.g., straight, zig-zag, S-shaped, curved, diagonal/sloped, non-linear, piecewise, curvilinear, linear, or any combination thereof. In some embodiments, the waveguide 320 may have a shape similar to the channel 63. For example, in an embodiment where the channel 63 has a curvilinear shape, the waveguide 320 may have a curvilinear shape. In a further embodiment, the waveguide 320 may conform to and line the channel 63. However, in other embodiments, the waveguide 320 may have any suitable shape, which may be different than a shape of the channel 63. For example, in an embodiment where the channel 63 has a curvilinear shape, the waveguide 320 may have a straight or zig-zag shape.

FIGS. 6A-6C illustrate the process involved with producing the reading in response to the interaction of the magnetostrictive sensor 312 and the magnet 330. As shown in FIG. 6A, a current pulse labelled "$I_{pulse}$" is propagated down the first end 321 and toward the second end 322 of the waveguide 320 at a time $t=0$. The current pulse $I_{pulse}$ may be generated with a pulse generator (not shown), which may be a part of the magnetostrictive sensor 312. The magnetostrictive sensor 312 may be configured to control the pulse generator to generate the current pulse $I_{pulse}$. In other examples, the pulse generator may be controlled by the controller 306.

FIG. 6B illustrates the interaction of the magnetostrictive sensor 312 and the magnet 330. In FIG. 6B, the current pulse $I_{pulse}$, interacts with the magnetic field B radiating from the magnet 330, causing the waveguide 320 to change in shape. As such, the interaction causes the waveguide 320 to undergo a strain force, labelled "ε" in FIG. 6B.

In FIG. 6C, a strain pulse, labelled "$\varepsilon_{pulse}$" and which is generated by the strain force ε, propagates back toward the first end 321 of the waveguide 320. When the strain pulse $\varepsilon_{pulse}$ reaches the first end 321 of the waveguide 320, the magnetostrictive sensor 312 provides a reading indicative of the position of the magnet 330. In some embodiments, the reading provided by the magnetostrictive sensor 312 may be a voltage or time indicative of the position of the magnet 330. For example, in the embodiment of FIG. 6C, the magnetostrictive sensor 312 provides that the strain pulse $\varepsilon_{pulse}$ reaches the first end 321 of the waveguide 320 at a time $t=t_2$.

The orientation of the ends 321, 322 of the channel 63 and directions of the pulses may be different from what is shown in the Figures and described in the examples herein.

The magnetostrictive sensor 312 can provide an analog reading indicative of the position of the slidable member 50 in the channel 63. In such embodiments, the magnetostrictive sensor 312 provides an analog reading for each possible position of the slidable member 50 in the channel 63. As such, the magnetostrictive sensor 312 allows the controller 306 to determine the position of the slidable member 50 with a high degree of accuracy. The true or absolute position of the slidable member 50 along the length of the channel 63 can determined with high-resolution. In turn, the pose of the patient transport apparatus 10 can be identified in a highly accurate manner, without reducing the pose to just a few coarse approximations. Hence, any downstream actions/controls/notifications described herein sufficiently take into account the true or absolute position of the pose of the patient transport 10.

As such, after the magnetostrictive sensor 312, or any other suitable sensor 302, produces the reading indicative of the position of the slidable member 50 in the channel 63, the method proceeds to steps 104 and 106. During step 104, the controller 306 determines the position of the slidable member 50 in the channel 63. In one embodiment, the controller 306 may determine the position of the slidable member 50 in the channel 63 by inputting the reading received from the sensor 302 in a lookup table. During step 106, the controller 306 determines the pose of the support frame 16. In one embodiment, the controller 306 may determine the pose of the support frame 16, which includes a unique combination of a position of the support frame 16 and an orientation of the support frame 16, by inputting the position of the slidable member 50, determined during step 104, in a lookup table.

It should also be noted that, in some embodiments, the magnetostrictive sensor 312 may be configured to further produce a reading indicative of a position of a magnetic device which is not coupled to the slidable member 50. For example, in one such embodiment, the magnetostrictive sensor 312 may be configured to produce a reading indicative of a position of a magnetic device which is located in an ambulance, referred to herein as an "In Ambulance" magnetic device. To further explain, the "In Ambulance" magnetic device may be located in the ambulance such that when the patient transport apparatus 10 is loaded into the ambulance, the magnetostrictive sensor 312 produces a reading indicative of a position of the "In Ambulance" magnetic device. Based on the position of the "In Ambulance" magnetic device, the controller 306 may disable certain features of the patient transport apparatus 10. For example, upon determining that the "In Ambulance" magnetic device is adjacent the second end 65 of the channel 63 based on readings from the magnetostrictive sensor 312, the controller 306 may disable an ability to control the actuator 53.

As previously stated, each position of the slidable member 50 in the channel 63 corresponds to one pose of support frame 16, which includes a combination of a position and an orientation of the support frame 16 relative to the base 26. Similarly, each pose of the support frame 16 corresponds to one position of the slidable member 50 in the channel 63. However, when a load is applied to the support frame 16, such as, when a patient is disposed on the patient support surface 17, the pose of the support frame 16 may be altered without altering the position of the slidable member 50 in the channel 63. For example, a patient disposed on the patient support surface 17 may adjust an orientation of the support frame 16 within a certain mechanical tolerance allowed by components of the patient transport apparatus 10. Similarly, a patient disposed on the patient support surface 17 may adjust a position (e.g., height) of the support frame 16 with a certain mechanical tolerance allowed by components of the patient transport apparatus 10. In such instances, the load applied to the support frame 16 adjusts the pose of the support frame 16 to a loaded pose of the support frame 16, thereby accounting for pose changes occurring from the load.

FIG. 5 also provides steps 108, 110, 112 for determining the loaded pose of the support frame 16. As shown, FIG. 5 provides the step 108 of producing, with one or more load cells 304, a reading indicative of the load applied to the support frame 16. The one or more load cells 304 may include any suitable load cell for producing a reading indicative of the load applied to the support frame 16. For example, the one or more load cells 304 may include a hydraulic load cell, a pneumatic load cell, or a strain gauge. Furthermore, the one or more load cells 304 may be disposed at any suitable position on the patient transport apparatus 10.

FIG. 5 also provides the step 110 of determining, with the controller 306, the load applied to the support frame 16 based on the reading from the one or more load cells 304 and the step 112 of determining, with the controller 306, the loaded pose of the support frame 16 based on the determined load applied to the support frame 16 and based on the pose of the support frame 16 determined during step 106. In one embodiment, the controller 306 may determine the load applied to the support frame 16 by inputting the reading received from the one or more load cells 304 in a lookup table. In one embodiment, the controller 306 may determine the loaded pose of the support frame 16, by inputting the pose of the support frame 16, determined during step 104, and the load applied to the support frame 16, determined during step 110, in a lookup table. As such, the patient transport apparatus 10 may advantageously determine the pose of the support frame 16 even after the pose of the support frame 16 is adjusted after a load is applied to the support frame 16.

In some embodiments, the controller 306 may provide suggestions to an operator of the patient transport apparatus 10 based on the pose of the support frame 16 and/or the loaded pose of the support frame 16. For example, in one example, the controller 306 may determine that the support frame 16 is above a threshold height for safely loading the patient transport apparatus 10 into an ambulance based on the loaded pose of the support frame 16. As such, the controller 306 may notify the operator of the patient transport apparatus 10 via a visual indicator on the patient transport apparatus 10. Similarly, the controller 306 may notify the operator if the support frame 16 is below the threshold height. In such an embodiment, the threshold height may be predetermined and programmed into the controller 306. The threshold height may also be provided by the operator of the patient transport apparatus 10 using a user interface of the patient transport apparatus 10. The suggestions may be haptic, audible, and/or visual.

It will be further appreciated that the terms "include," "includes," and "including" have the same meaning as the terms "comprise," "comprises," and "comprising." Moreover, it will be appreciated that terms such as "first," "second," "third," and the like are used herein to differentiate certain structural features and components for the non-limiting, illustrative purposes of clarity and consistency.

Several configurations have been discussed in the foregoing description. However, the configurations discussed herein are not intended to be exhaustive or limit the invention to any particular form. The terminology which has been used is intended to be in the nature of words of description rather than of limitation. Many modifications and variations are possible in light of the above teachings and the invention may be practiced otherwise than as specifically described.

What is claimed is:

1. A patient transport apparatus comprising:

a base;

a wheel assembly operatively attached to the base and including a wheel arranged for movement along ground surfaces;

a support frame with a patient support deck defining a patient support surface, the support frame extending longitudinally between a head-end and a foot end;

a channel formed extending along the support frame between a first end and a second end with a curvilinear portion arranged adjacent to the first end and with a linear portion arranged adjacent to the second end; and a frame assembly coupled between the support frame and the base, the frame assembly including an actuator, and a slidable member disposed in the channel and movable between a plurality of different positions in the channel to place the support frame in a plurality of different poses relative to the base via operation of the actuator, the plurality of different poses including:

at least one pose defined with the head-end of the support frame oriented at a first angle relative to the base when the slidable member is disposed along the curvilinear portion of the channel, and at least one pose defined with the head-end of the support frame oriented at a second angle, different from the first angle, relative to the base when the slidable member is disposed along the linear portion of the channel.

2. The patient transport apparatus of claim 1, wherein the first angle is larger than the second angle.

3. The patient transport apparatus of claim 2, wherein the first angle is larger than fifteen degrees; and wherein the second angle is smaller than ten degrees.

4. The patient transport apparatus of claim 1, wherein the plurality of different poses include:

a maximum raised pose defined with the slidable member positioned in the curvilinear portion of the channel and arranged adjacent to the first end, and with the head-end of the support frame oriented at the first angle relative to the base; and a maximum lowered pose defined with the slidable member positioned in the linear portion of the channel and arranged adjacent to the second end, and with the head-end of the support frame oriented at the second angle relative to the base.

5. The patient transport apparatus of claim 1, wherein each position of the slidable member in the channel corresponds to one pose of the support frame.

6. The patient transport apparatus of claim 1, wherein each pose of the support frame corresponds to one position of the slidable member in the channel.

7. The patient transport apparatus of claim 1, wherein each pose of the support frame defines a unique combination of a position and an orientation of the support frame relative to the base.

8. The patient transport apparatus of claim 1, wherein the support frame comprises a length and a width, wherein the length is longer than width, with the support frame further comprising two opposing sides along the width coupled to two opposing sides along the length, and wherein the channel is defined in a bracket coupled to the support frame at one of the sides along the length; and wherein the slidable member is moveable in the channel whereby a distance between the slidable member and the one of the sides along the length is variable.

9. The patient transport apparatus of claim 1, wherein the base comprises a base head-end and a base foot-end; and wherein the frame assembly includes:

a first frame member having a first end pivotally coupled adjacent to the foot-end of the support frame and a second end pivotally coupled adjacent to the base head-end of the base; and a second frame member having a first end pivotally coupled adjacent to the head-end of the support frame and a second end pivotally coupled adjacent to the base foot-end of the base.

10. The patient transport apparatus of claim 9, wherein the slidable member is coupled to the first end of the first frame member.

11. The patient transport apparatus of claim 10, wherein the first frame member is configured to move the slidable member between the plurality of different positions in the channel.

12. The patient transport apparatus of claim 9, wherein the actuator is coupled to at least one of the first frame member and the second frame member and configured to move at least one of the first frame member and the second frame member to place the support frame in the plurality of different poses.

13. The patient transport apparatus of claim 12, wherein the plurality of different poses include:

a maximum raised pose defined with the slidable member positioned in the curvilinear portion of the channel and arranged adjacent to the first end of the channel, and with the head-end of the support frame oriented at the first angle relative to the base; and a maximum lowered pose defined with the slidable member positioned in the linear portion of the channel and arranged adjacent to the second end of the channel, and with the head-end of the support frame oriented at the second angle relative to the base.

14. The patient transport apparatus of claim 13, wherein a distance between the first end of the first frame member and the second end of the second frame member and a distance between the second end of the first frame member and the first end of the second frame member are each maximized in the maximum raised pose and are each minimized in the maximum lowered pose.

15. The patient transport apparatus of claim 1, further comprising a bracket coupled to the support frame; and wherein the channel is defined in the bracket.

16. The patient transport apparatus of claim 1, further comprising:

a sensor configured to detect the slidable member in the channel and produce a reading; and a controller coupled to the sensor and to the actuator to move the support frame between the plurality of different poses relative to the base, with the controller configured to:

receive the reading from the sensor, determine a position of the slidable member in the channel based on the reading, and determine the pose of the support frame relative to the base based on the determined position of the slidable member.

17. The patient transport apparatus of claim 16, wherein the sensor is disposed in the channel.

18. The patient transport apparatus of claim 16, wherein the sensor comprises one or more of an optical sensor, an ultrasonic sensor, a Hall effect sensor, a laser sensor, a proximity sensor, a velocity sensor, a displacement sensor, an Eddy-current sensor, a capacitive displacement sensor, a magnetic sensor, and an inductive non-contact position sensor.

19. The patient transport apparatus of claim 16, further comprising a magnet coupled to the slidable member; and wherein the sensor comprises a magnetostrictive sensor configured to detect the slidable member in the channel by producing the reading in response to an interaction of the magnetostrictive sensor and the magnet.

20. The patient transport apparatus of claim 19, wherein the magnetostrictive sensor comprises a waveguide comprising magnetostrictive material.

* * * * *